United States Patent [19]

Hourlier

[11] Patent Number: 4,809,959
[45] Date of Patent: Mar. 7, 1989

[54] HYDRAULIC ANTIVIBRATORY SUPPORTS

[75] Inventor: François Hourlier, Chateaudun, France

[73] Assignee: Hutchinson, France

[21] Appl. No.: 945,886

[22] Filed: Dec. 24, 1986

[30] Foreign Application Priority Data

Dec. 24, 1985 [FR] France .................. 85 19160

[51] Int. Cl.$^4$ .................. F16F 13/00; B60K 5/12
[52] U.S. Cl. .................. 267/140.1; 248/565; 248/636; 267/35
[58] Field of Search .................. 267/140.1, 35, 217, 267/219; 180/312; 248/565, 566, 636, 638, 659

[56] References Cited

U.S. PATENT DOCUMENTS 3,888,450  6/1975  Seilenbinder .................. 267/140.1
4,721,292  1/1988  Saito .................. 267/140.1

FOREIGN PATENT DOCUMENTS 0027751  4/1981  European Pat. Off. .............. 267/35
0192139  9/1985  Japan .................. 267/140.1

Primary Examiner—Andres Kashnikow
Assistant Examiner—Matthew C. Graham
Attorney, Agent, or Firm—Larson and Taylor

[57] ABSTRACT

In a hydraulic antivibratory support intended to be interposed between two rigid elements (1 and 3) and including a work chamber (A) and a compensation chamber (B) separated by a dividing wall (10) and connected permanently together through a restricted passage (11), the whole of these chambers and this passage being filled with liquid, the work chamber is defined outwardly by an annular support wall (7) having the general shape of two hollow and thick truncated cones of opposite directions ($7_1$ and $7_2$) juxtaposed axially by their two large bases, their two small bases being connected respectively to the two rigid elements.

6 Claims, 1 Drawing Sheet

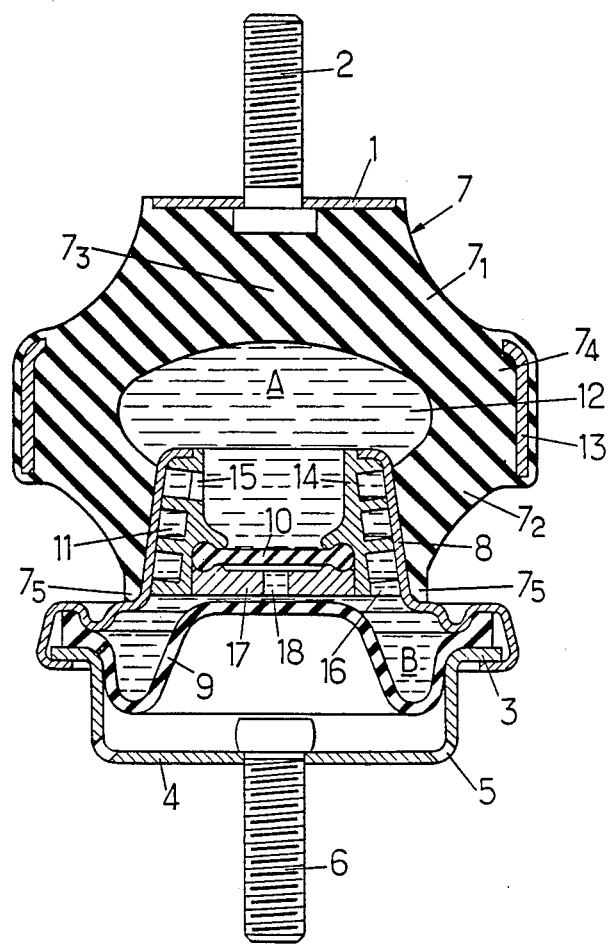

HYDRAULIC ANTIVIBRATORY SUPPORTS

The invention relates to antivibratory devices intended to be interposed between two rigid elements individually subjected to certain oscillations and/or vibrations for support and shock absorbing purposes, the shock absorbing causing a liquid mass placed in a restricted passage to resonate.

By way of non limitative example, such supports may be mounted between a vehicle chassis and the engine of this vehicle for absorbing not only the oscillations imposed on the chassis by the irregularities and variations in level of the ground while the vehicle is travelling over this ground but also the vibrations due to the operation of the engine.

The invention relates more particularly, among the supports of the kind in question, to those which are formed by a sealed case interposed between the two rigid elements, which case has a rigid base securable to one of the two rigid elements, a rigid ring securable to the other rigid element, a resilient annular support wall sealingly connecting the base to the ring and a flexible membrane connected sealingly to the ring, the inside of this case being divided by a sealed dividing wall connected to the ring between the annular wall and the membrane into two chambers, namely a work chamber on the annular wall side and a compensation chamber on the membrane side, these two chambers communicating permanently with each other through the above restricted passage, which is advantageously formed by a curved channel situated in the connection zone between the annular wall and the ring, and a liquid mass filling the two chambers as well as the restricted passage.

With such a support, the oscillations or vibrations created between the two rigid elements result in moving these two elements axially in turn towards or away from one another.

Those of these oscillations which have a relatively low frequency (less than 20 Hz) and a relatively high amplitude (greater than 0.5 mm) cause the liquid to flow from one of the two chambers into the other through the restricted passage and conversely, which provides high damping for some of these oscillations by causing the liquid mass flowing through said passage to resonate, the dimensions of this latter being chosen accordingly.

The above defined supports, with a single work chamber, should not be confused with the support comprising two work chambers and no compensation chamber, in which the opposite ends of the two work chambers are secured together by a central bolt which passes through the assembly of these two chambers: the oscillations and vibrations likely to be correctly damped with such "twin chamber" supports are generally less varied than with the "single chamber" supports.

In known embodiments of single chamber supports of the kind in question, the resilient annular support wall defining this chamber generally has the form of a thick, hollow truncated cone in that it is defined inwardly and outwardly by two substantially parallel surfaces of a truncated cone shape appearance, the large base of said truncated cone shaped wall being connected to the rigid ring and its small base to the rigid base.

The corresponding supports often give satisfaction but the travel of their resilient deformations are limited in all directions, that is to say not only in the axial direction of the support but also in transverse directions, which results for said support in relatively high minimum stiffnesses.

The purpose of the invention is especially to overcome these drawbacks by conferring on the supports considered large resilient deformation travel distances and low stiffness.

For this purpose, the supports according to the invention are essentially characterized in that their annular support wall has the general shape of two hollow and thick truncated cones in opposite directions juxtaposed axially by their large bases, the two small bases of these truncated cones being connected respectively to the rigid base and to the rigid ring.

A construction of this kind has already been proposed for the resilient annular support wall included in a two chamber support. But in this case, said support wall is formed by the two halves of one and the same bellows, in which halves only one works under compression and the other under traction: in the case of the present invention, only the resistance to compression, leading to a relatively massive construction, is to be considered.

In advantageous embodiments, recourse is further had to one and/or the other of the following arrangements:

a rigid annular frame is adhered to the resilient material forming the annular support wall at the level of its enlarged zone in which the two above large bases are connected, the portion, of the internal face of the work chamber, defined by the annular support wall has an ellipsoidal form of revolution, in a way known per se, the restricted passage is in the form of a helical channel, in a way known per se, the sealed dividing wall has a central portion movable or deformable by flexing perpendicularly to its mean plane and the amplitudes of its movements or deformations are limited to a relatively low value, i.e. of the order of 0.5 mm.

The invention includes, apart from these main arrangements, certain other arrangements which are preferably used at the same time and which will be more explicitly discussed hereafter.

In what follows, a preferred embodiment of the invention will be described with reference to the accompanying drawings in a way which is of course in no wise limitative.

The single FIGURE of these drawings shows in axial section a hydraulic antivibratory support constructed in accordance with the invention.

In a way known per se, the support considered has a general form of revolution about an axis and includes:

a rigid base 1 integral with a fixing bolt 2, a rigid ring 3 forming the edge of a cup 4 perforated at 5 and having passing centrally therethrough a welded fixing bolt 6, a resilient annular support wall 7 whose two ends are adhered respectively to base 1 and to ring 3 and more precisely to an annular piece 8 integral with this ring, a flexible membrane 9 whose periphery is sealingly connected to the ring 3, a sealed dividing wall 10 whose periphery is sealingly connected to ring 3, which wall divides the inner volume of the sealed case formed by the above elements into two chambers, namely a work chamber A on wall 7 side and a compensation chamber B on the membrane 9 side, a restricted passage 11 formed in the dividing wall 10 or in its periphery, and a liquid mass 12 filling the sealed case, including the passage 11.

It is the annular resilient support wall 7 which is more particularly concerned by the present invention.

This wall 7, formed by a rubber or other elastomer molding in this case has the general shape of two thick and hollow truncated cones $7_1$ and $7_2$ oriented in opposite directions and juxtaposed along their large bases.

It is the small bases of these two truncated cones $7_1$ and $7_2$ which are connected sealingly, respectively, to base 1 and to ring 3: the small base of the truncated cone $7_1$ which is connected to base 1 is preferably extended towards the axis of the support by a cover $7_3$ integrally molded with the wall and closing this small base.

The surfaces which define inwardly and outwardly each of the two truncated cones may have a truncated cone shape.

But they may also have axial half sections with shapes other than those of straight line segments.

Thus, in the embodiment illustrated, these axial half sections have curved shapes conferring on the inner surface of the work chamber A the general shape of an ellipsoid of revolution whereas the external axial half section of each truncated cone shaped section has substantially the shape of a quarter of a circle formed in the rubber and extending from a first end situated at the level of the first base of the cone concerned and oriented substantially parallel to the axis of the support to a second end oriented radially outwardly of the support.

The enlarged portion of wall 7, included axially between these two ends, forms a relatively thick pad $7_4$ in the axial and radial directions, which pad is reinforced in its peripheral zone by a rigid annular frame 13 buried in the mass and intended to avoid deformation of said pad.

The truncated cone shaped sections $7_1$ and $7_2$ may be molded separately then fixed together at their large bases by bonding and/or post vulcanization.

They may also be integrally molded with each other, with a rigid inner core, whose removal from the mold is made possible because of the elasticity of the rubber, by moving apart the lips $7_5$ defining the small base of section $7_2$.

In an interesting variant, wall 7 is molded as a single block and the rigid annular piece 8 is adhered when hot to this wall during molding thereof, the internal core required for forming the work chamber A then having an expandable and retractible shape for extraction thereof and being formed more particularly by a bag inflatable by means of a pressurized fluid, as is well known in the tyre manufacturing technique.

Since the wall portion 7 which is connected to the rigid ring 3 is formed by lips $7_5$ which define a small base of the doubly truncated cone shaped wall considered and on longer a large base of a single truncated cone shaped wall, as in known embodiments, less room is available here than in these known constructions for positioning the channel forming the restricted passage 11.

Instead then of extending this channel over a single arc of a circle of the order of 270° disposed at the periphery of the dividing wall 10, it is here extended over several successive turns of a helix, which has advantageously a slightly truncated cone shape converging in the direction of base 1.

The helical channel 11 thus defined is advantageously defined inwardly—i.e. on the axis side of the suppor-t—by a helical groove formed in the outer lateral face of a thick tubular wall 14 and outwardly by a portion of the above piece 8.

The ends of this channel 11 open respectively at 15 and 16 into the two chambers A and B.

The sealed dividing wall 10 could be rigid.

In the embodiment illustrated, it is formed by a deformable membrane extending perpendicularly to the axis of the support and the amplitudes of its deformations parallel to this axis are limited by its abutment against a rigid dividing wall 17 perforated at 18.

This rigid perforated dividing wall 17 could be divided into two in that a second perforated wall could be provided on the other side of membrane 10.

As is well known, said membrane 10 damps certain vibrations of a higher frequency and a lower amplitude than those damped by causing the liquid contained in channel 11 to resonate.

Following which, and whatever the embodiment adopted, a hydraulic antivibratory support is finally provided whose construction follows sufficiently from the foregoing.

The operation of such a support is similar to that of known supports: the oscillations and/or vibrations imposed on the rigid base 1 with respect to the rigid ring 3 or conversely, result in deformations of the doubly truncated cone shaped wall 7, which are applied to the liquid mass 16 and ensure damping because of the resonance of the portion of this mass disposed in channel 11 and of the vibrations of the dividing wall 10 if this latter is provided movable or deformable.

Such a support in particular damps the vibrations and/or oscillations transmitted between a vehicle chassis to which bolt 6 is fastened and the engine of this vehicle bolted to bolt 2.

The deformation travels likely to be imposed without damaging the doubly truncated cone shaped wall 7 are here particularly high because the portions of this wall called on to work are in practice doubled with respect to those of known supports having a single truncated cone shaped wall, the two sections $7_1$ and $7_2$ being free to deform.

This result is obtained without increasing the overall diameter of the support, only its axial dimension being slightly increased.

The stiffness of said support may be reduced proportionally thereby, which may be very advantageous in certain cases.

As is evident and as it follows moreover already from what has gone before, the invention is in no wise limited to those of its modes of application and embodiments which have been more specially considered; it embraces, on the contrary, all the variants thereof, particularly:

those in which the sealed dividing wall 10 dividing the inside of the case into two chambers A and B is rigid and fixed and not deformable, those in which this sealed dividing wall 10 has a central portion which is rigid but movable with limited freedom, those in which said sealed dividing wall 10 is pierced with at least one hole connecting the two chambers together and forming a second restricted passage parallel to the restricted passage 11, those in which a portion of the internal face of the doubly truncated cone shaped wall 7 is formed by a sealed web deformable or movable with limited freedom of movement, connected sealingly to the rest of the wall, the outer face of which web would communicate with the free air.

I claim:

1. A hydrualic antivibratory support intended to be interposed between two rigid elements individually subjected to certain oscillations and including a sealed case interposed between the two rigid elements, which case has a rigid base (1) securable to one of the two rigid elements, a rigid ring (3) securable to the other rigid element, a resilient annular support wall (7) sealingly connecting the base to the ring and a flexible membrane (9) sealingly connected to the ring, the inside of this case being divided, by a sealed dividing wall (10) connected to the ring between the annular wall and the membrane, into two chambers, namely a work chamber (A) on the annular wall side and a compensation chamber (B) on the membrane side, these two chambers communicating permanently with each other through a restricted passage (11), and a liquid mass (16) filling the two chambers as well as the restricted passage, characterized in that its annular support wall (7) has the general shape of two hollow and thick truncated cones, each cone having a large base and a small base, said truncated cones being juxtaposed axially in opposite directions ($7_1$ and $7_2$) with their large bases against each other, the two small bases of these truncated cones being connected respectively to the rigid base (1) and to the rigid ring (3).

2. The support according to claim 1, characterized in that an annular rigid frame (13) is adhered to the resilient material forming the annular support wall (7) at the level of its enlarged zone ($7_3$) in which the two large bases of the truncated cone shaped section ($7_1$ and $7_2$) are connected.

3. The support according to claim 1, characterized in that the portion of the internal face of the work chamber (A) defined by the annular support wall (7) has an ellipsoidal form of revolution.

4. The support according to claim 1, characterized in that the restricted passage is in the form of a helical channel (11).

5. The support according to claim 1, characterized in that the sealed dividing wall (10) has a central portion movable by flexing perpendicularly to its mean plane and in that the amplitudes of its movements or deformations are limited to a relatively low value, namely of the order of 0.5 mm.

6. The support according to claim 1, characterized in that the sealed dividing wall (10) has a central portion deformable by flexing perpendicularly to its mean plane and in that the amplitudes of its movements or deformations are limited to a relatively low value, namely of the order of 0.5 mm.

* * * * *